F. M. BODE.
Coffee Roaster.
No. 80,329. Patented July 28, 1868.
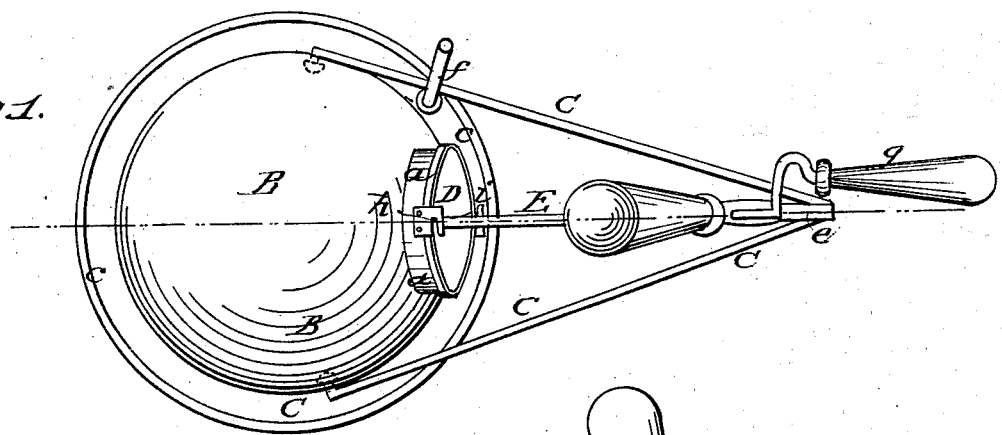
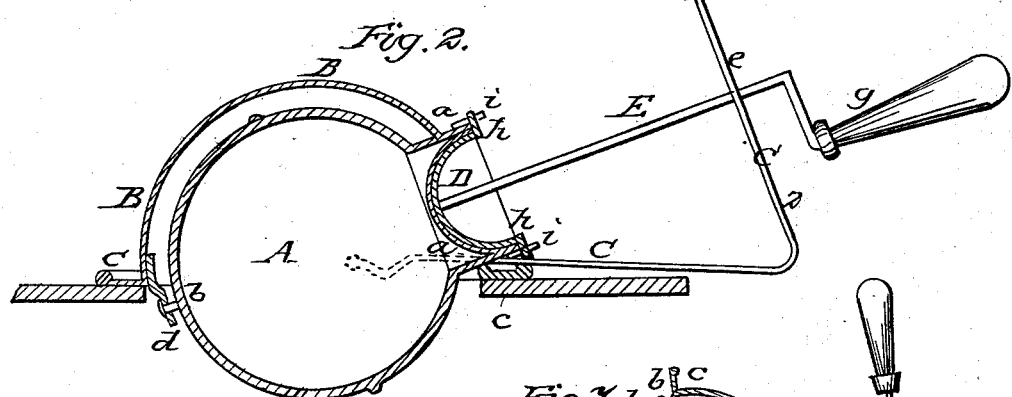
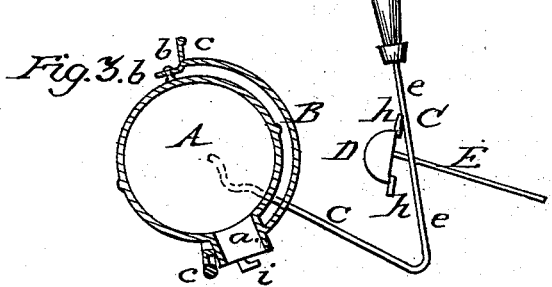
WITNESSES:
Wm A. Morgan
G. C. Crotton
INVENTOR:
F. M. Bode
per Munn & Co.
attorneys

United States Patent Office.

FRIEDRICH MAX BODE, OF VIENNA, AUSTRIA, ASSIGNOR TO C. B. MUELLER, OF HANOVER, PRUSSIA.

*Letters Patent No. 80,329, dated July 28, 1868.*

IMPROVEMENT IN COFFEE-ROASTERS.

The Schedule referred to in these Letters Patent and making part of the same.

TO ALL WHOM IT MAY CONCERN:

Be it known that I, FRIEDRICH MAX BODE, of Vienna, Austria, have invented a new and improved Coffee-Roaster; and I do hereby declare that the following is a full, clear, and exact description thereof, which will enable those skilled in the art to make and use the same, reference being had to the accompanying drawings, forming part of this specification, in which—

Figure 1 represents a plan or top view of my improved coffee-roaster.

Figure 2 is a vertical longitudinal section of the same.

Figure 3 is a vertical longitudinal section of the same, showing it in a different position.

Similar letters of reference indicate corresponding parts.

This invention relates to a new coffee-roaster, which consists of a spherical shell, hung in a semispherical jacket, its one axis being hollow, and serving as a filling and discharge-opening.

The shell can be revolved by means of a handle attached to the cover of the aforesaid hollow axis, which cover can be removed, to allow the filling in and discharge of the coffee.

A, in the drawing, represents a sheet-metal or other shell, of preferably spherical form, which is provided with a cylindrical neck or projecting neck, $a$, through which the coffee to be roasted is inserted and discharged.

Opposite to the neck $a$, and in line with the axis of the same, projects from the shell A, a pin, $b$.

B represents a semispherical or other jacket, with a flange, $c$, around its edge.

It has a circular aperture for the neck $a$ of the shell to fit through, and a lug or ear, $d$, for the pin $b$ to rest and turn in.

The shell A is thus supported or pivoted in the jacket B, so that it cannot be laterally displaced, but freely turned therein.

The neck projecting through the jacket allows the filling and emptying of the shell.

It will be noticed that when the jacket is placed upon a stove-plate so that the lower half of the shell projects through the opening in the stove-plate into the fire-box, as indicated in fig. 2, the axis of the neck and pivot is in an inclined position of about fifteen or sixteen degrees.

The fire or the heat of the fire will surround the lower part of the shell, and will also pass up between the jacket and shell, there being a space left between them, as shown in fig. 2, but no gases or vapors can escape from the stove into the room, as the hole in the stove-plate is completely covered by the jacket and its flange, $c$.

The said jacket forms, in connection with the flange, a continuation or completion of the stove-plate, below which the shell containing the coffee is held, so that the heat of the fire is free to play all around the said shell.

From the jacket B projects a bifurcated bar, C, which has a nearly upright portion, $e$, and on the outer end of which a handle is formed.

This bar serves as a handle when the apparatus is to be carried from and to the stove, and for holding it down upon the stove.

This handle C is either firmly attached to the jacket B, so that it has to be turned down when the shell is to be emptied or it is pivoted with its ends to opposite sides of the shell, so that the latter can be swung down together with the shell, for discharging the contents, as indicated in fig. 3.

When the handle C is thus pivoted to the jacket, there should be a small crank, $f$, pivoted to the flange $c$, to lock it as long as the apparatus is in operation.

D is a cover for the neck. It is attached to a rod, E, that passes through or is guided on the upright portion, $e$, of the handle C, and that has a crank-handle, $g$, formed on its outer end.

From the cover D projects a lug or lugs, $h$, catching against a lug or lugs, $i$, that project from the neck $a$, as shown, so that when the cover is held against the mouth of the neck, and the handle $g$ turned, the shell A will be turned too.

The operation of the apparatus is as follows:

The cover D is drawn off the neck, so as to leave the mouth of the shell open to be filled.

When filled, the cover is applied, and the apparatus set upon a stove in the manner indicated in fig. 2.

The handle $g$ is then revolved, so as also to revolve the shell, thereby keeping the contents of the latter in constant motion, and exposing them all in an equal degree to the action of the heat.

The cover D can be drawn off from time to time, to allow the inspection of the contents.

When the coffee has been sufficiently roasted, the apparatus is taken off the fire, and can be emptied, in the manner hereinbefore set forth, and as indicated in fig. 3.

The results of this apparatus are that the usual toil and drudgery attending the roasting of coffee are not only completely overcome, but the apparatus also reduces this operation to an easy and pleasant task.

The roaster is placed over the fire of any cooking-stove, and the operator works it with the greatest ease, without having to stop at all.

I claim as new, and desire to secure by Letters Patent—

1. Arranging the mouth of the shell A so that it projects through the jacket B, as described, so that the contents of the shell can be easily inspected during operation, without requiring the removal of the apparatus from the stove.

2. A revolving coffee-roaster which turns on an inclined axis, substantially as herein shown and described.

3. The cover D of the revolving spherical vessel A, when so arranged that it serves at once as a cover and as a clutch for connecting the said vessel with its crank-handle, as specified.

4. The construction and combination with each other of the spherical vessel A, having the cylindrical neck $a$, and the pin $b$ of the jacket B, with its flange $c$, and of the handle C, cover D, and handle E, all made and operating substantially as herein shown and described.

The above specification of my invention signed by me, this    day of    , 1868.

FRIEDRICH MAX BODE.

Witnesses:
    Dr. KARL SAAFF,
    Dr. VICTOR BRAUNHOFER.